United States Patent
Rose et al.

(10) Patent No.: US 10,419,160 B2
(45) Date of Patent: Sep. 17, 2019

(54) COMMUNICATION DEVICE AND METHOD FOR EFFICIENTLY RECEIVING MIMO SIGNALS

(71) Applicant: Huawei Technologies Co., Ltd., Shenzhen (CN)

(72) Inventors: Luca Rose, Boulogne Billancourt (FR); Axel Mueller, Boulogne Billancourt (FR)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/952,863

(22) Filed: Apr. 13, 2018

(65) Prior Publication Data

US 2018/0234205 A1    Aug. 16, 2018

Related U.S. Application Data

(63) Continuation of application No. PCT/EP2015/073749, filed on Oct. 14, 2015.

(51) Int. Cl.
*H04L 1/00* (2006.01)
*H04B 7/0413* (2017.01)
(Continued)

(52) U.S. Cl.
CPC ........... *H04L 1/005* (2013.01); *H04B 7/0413* (2013.01); *H04L 1/0048* (2013.01);
(Continued)

(58) Field of Classification Search
CPC ............... H04L 1/005; H04L 25/03191; H04L 25/03286; H04L 1/0048; H04L 25/03891;
(Continued)

(56) References Cited

U.S. PATENT DOCUMENTS 7,593,492 B1    9/2009  Lande
8,869,010 B1   10/2014  Sheng et al.
(Continued)

FOREIGN PATENT DOCUMENTS

WO    2008023921 A1    2/2008
WO    2010139008 A1   12/2010

OTHER PUBLICATIONS

Fan et al.,"Near Maximum Likelihood Detection Schemes for Wireless MIMO Systems," IEEE Transaction on Wireless Communications, vol. 3, No. 5, Institute of Electrical and Electronics Engineers, New York, New York (Sep. 2004).
(Continued)

*Primary Examiner* — Vineeta S Panwalkar
(74) *Attorney, Agent, or Firm* — Leydig, Voit & Mayer, Ltd.

(57) ABSTRACT

Communication device adapted for receiving a MIMO signal is provided. The device comprises a first detector adapted to perform a first symbol detection on the MIMO signal using a first detection method, a detection error determination unit adapted to determine a first detection error of the first symbol detection, a detection error judging unit adapted to determine if the first detection error is above or below a detection threshold, and a second detector, adapted to perform a second symbol detection on the MIMO signal using a second detection method, if the detection error judging unit has determined that the first detection error is above the detection threshold. The communication device is adapted to use results of the symbol detection as final symbol detection results, if the detection error judging unit has determined that the first detection error is below the detection threshold.

18 Claims, 8 Drawing Sheets

(51) Int. Cl.
*H04L 25/03* (2006.01)
*H04B 7/08* (2006.01)

(52) U.S. Cl.
CPC .. *H04L 25/03191* (2013.01); *H04L 25/03286* (2013.01); *H04L 25/03891* (2013.01); *H04B 7/0854* (2013.01); *H04L 1/0054* (2013.01); *H04L 25/03242* (2013.01); *H04L 2025/03426* (2013.01); *H04L 2025/03624* (2013.01); *H04L 2025/03726* (2013.01)

(58) Field of Classification Search
CPC ..... H04L 25/03242; H04L 2025/03624; H04L 1/0054; H04L 2025/03426; H04L 2025/03726; H04B 7/0413; H04B 7/0854
See application file for complete search history.

(56) References Cited

U.S. PATENT DOCUMENTS

| 2007/0150797 | A1 | 6/2007 | Hwang et al. |
| 2009/0052591 | A1 | 2/2009 | Chen |
| 2009/0327835 | A1 | 12/2009 | Oteri et al. |
| 2010/0246732 | A1* | 9/2010 | Seo ...................... H04B 7/0857 375/341 |
| 2013/0243062 | A1 | 9/2013 | Raju et al. |
| 2017/0077968 | A1* | 3/2017 | Hsu ...................... H04B 1/0475 |

OTHER PUBLICATIONS

Zanella et al., "MMSE Reception and Successive Interference Cancellation for MIMO Systems With High Spectral Efficiency," IEEE Transaction on Wireless Communications, vol. 4, No. 3, Institute of Electrical and Electronics Engineers, New York, New York (May 2005).

Zimmermann et al.,"On the Complexity of Sphere Decoding," IEEE Transactions on Signal Processing, vol. 53, Issue 4, pp. 1474-1484, Institute of Electrical and Electronics Engineers, New York, New York (Apr. 2005).

Hassibi et al., "On the Sphere-Decoding Algorithm I. Expected Complexity", IEEE Transactions on Signal Processing, vol. 53, No. 8, pp. 2806-2818, Institute of Electrical and Electronics Engineers, New York, New York (Aug. 2005).

Kim et al., "Performance Analysis of MIMO System with Linear MMSE Receiver," IEEE Transaction on Wireless Communications, vol. 7, No. 11, pp. 4474-4478, Institute of Electrical and Electronics Engineers, New York, New York (Nov. 2008).

* cited by examiner

```
INPUT: channel_matrix, ϵ, input signal
BEGIN
SET dec_bool = 1; H=channel_matrix; y := input signal; temp_sic := 0
  REPEAT WHILE dec_bool == 1
    1) SET $W_{MMSE} = (H^H H + \sigma^2 I)^{-1} H^H$
    2) SET $\tilde{x} = W_{MMSE} y$
    3) HARD-DECODE based on $\tilde{x}$: $\hat{x} = f_{STEP}(\tilde{x})$
    4) SET $d = \|H\hat{x} - y\|_2^2$
    5) If $d \leq N_{Rx}\sigma^2 + \epsilon$
        1) SET dec_bool := 0
    6) Output $x_{OUT} = \tilde{x}$ or $x_{OUT} = \hat{x}$
    7) ELSE
        1) $N = argmax(diag(H^H H + \sigma^2 I))$
        2) Decode using SIC n-th element of the vector $x_{OUT}$
        3) $y := y - Hx_{OUT}$
        4) Remove n-th column from H
        5) IF length(y)==0 -> SET dec_bool := 0
    8) END IF
  END WHILE
END
```

Fig. 3

COMMUNICATION DEVICE AND METHOD FOR EFFICIENTLY RECEIVING MIMO SIGNALS

CROSS-REFERENCE TO RELATED APPLICATIONS

This application is a continuation of International Application No. PCT/EP2015/073749, filed on Oct. 14, 2015, the disclosure of which is hereby incorporated by reference in its entirety.

TECHNICAL FIELD

Embodiments of the application relate to a communication device and communication method, especially for receiving MIMO signals in an energy efficient and precise manner.

BACKGROUND

In recent times, multi-antenna (or multiple-input and multiple-output, MIMO) systems have been adopted to increase throughput, known as multiplexing gain, and improve reliability, known as diversity gain, in wireless communication. In single user MIMO (SU-MIMO)—a single transmitter (TX) equipped with multiple antennas transmits a certain number of streams to a single receiver (RX) equipped with multiple antennas. Each signal transmitted from the transmit antennas will be received, after been filtered by the channel, by all the receiving antennas, thus each receiving antenna receives a scattered and interfered version of each of the transmit symbols.

Several techniques have been created in order to mitigate negative interference effects, or, more smartly, to exploit this interference, in order to improve the detection of the transmitted signal. Remarkably, under the assumption of Gaussian signaling, perfect channel knowledge at the TX and the RX, perfect power and bit allocation at the transmitter, a simple linear precoder and decoder obtained by the singular value decomposition (SVD) of the channel matrix is sufficient to achieve optimal performance. However, there exist a number of cases in which those assumptions cannot be respected. For instance, real transmissions do not have Gaussian signaling properties, they always being drawn from some finite size alphabet, generally M-QAM or M-PSK. Secondly, in many cases the TX is not controllable by the RX, or it is oblivious of the channel matrix. In these cases, there arises the problem of how the RX can minimize its bit error rate (BER) by employing some smart equalization algorithm.

So far, the most effective algorithm, from this point of view, is the maximum likelihood (ML) approach, which compares all possible transmitted signals filtered by the channel matrix with the received signal and selects the one with the minimum distance. This approach is clearly impractical, since it requires an enormously high amount of calculation, since the number of operation grows exponentially with the constellation size and the number of transmit antennas.

Henceforth, a number of algorithms have been developed, most remarkably the sphere decoder (SD), which searches a reduced ML space with lower complexity and efficiency, the MMSE-successive interference cancellation (MMSE-SIC), which once it decodes a symbol, it subtracts the interference it creates to other symbols prior decoding them, and linear technique such as minimum mean square error (MMSE) and zero-forcing (ZF), which decode by multiplying the received vector by a particularly designed decoding matrix.

Each approach has its own advantages and disadvantages. Linear solutions have a low complexity and have almost optimal performance at low level of Eb/N0. SD is close to optimal, but its already high complexity grows with the constellation size of the employed communication scheme. MMSE-SIC has low complexity, but it is anyway wasted at low Eb/N0.

Consider a single user point-to-point MIMO link as the one depicted in FIG. 1. A transmitter comprises a channel coder 3 and a MIMO precoder 4. A receiver 2 comprises a MIMO equalizer 5 and a channel decoder 6. The transmitter 1 employs a sub-optimal precoding strategy known at the receiver 2. The receiver 2 needs to minimize its own BER using the minimum possible complexity. The transmitter 1 is equipped with $N_t$ transmit antennas, the receiver 2 with $N_{Rx}$ receive antennas, yielding a channel matrix $\tilde{H} \in \mathbb{C}^{N_{Rx} \times N_t}$.

The transmitter 1 shapes its transmit vector by means of a linear precoder W. From the receiver point of view, this transforms the channel matrix into an effective channel matrix H=HW, with $H \in \mathbb{C}^{N_{Rx} \times N_t}$. The transmit vector is denoted by $x=[x_1, x_2, \ldots x_{N_t}]^T$, with each element of the vector belonging to a finite size constellation such as BPSK or 16-QAM. The dimension of the constellation is indicated by the letter M. The received signal is denoted by $y=[y_1, y_2, \ldots y_{N_{Rx}}]^T$, where y=Hx+n. Here, n is modeled as a complex Gaussian additive noise of which each entry has variance $\sigma^2$. The goal of an equalization algorithm is to give an estimation as precise as possible of the vector x knowing y and H. This estimation can be expressed as:

$$\tilde{x} = g_H(y)$$

where the function $g_H(\bullet)$ is the equalization function, indexed from the channel matrix H. The hard-decoding function is denoted by $f_{STEP}(\bullet)$.

To equalize MIMO channels, there exist in the literature a number of solutions. In general, these solutions can be divided into two large sets depending on the nature of the function $g_H(\bullet)$: linear and non-linear equalizations.

Linear solutions consider the interference as Gaussian noise and they attempt to mitigate its negative effects. Simply, they consist in pre-multiplying the received vector for a matrix, the so called decoder, prior to applying the hard decoding.

Non-linear solutions are more complex algorithms and they exploit the peculiar nature of the interference in order to improve the equalization performance.

Linear solutions, such as ZF and MMSE, have a low complexity level and, compared to ML equalization, show good performance at low Eb/N0 level, whereas they lose a significant amount of information at medium and high Eb/N0. ML solutions maximize the performance of the equalizer but are characterized by high, sometimes unfeasible, complexity. Almost ML solutions, such as SD, reduce the search space of the ML but are anyway unfit for low complexity device and high order modulations. MMSE successive interference cancellation—MMSE-SIC—balances between the performance of the ML and the complexity of MMSE, having as an extra feature the fact of a complexity that is almost independent from the constellation size. However, its complexity is not justified when at low SNR.

| Algo-rithm | Perfor-mance | Complexity | Notes |
|---|---|---|---|
| ML | Optimal | $\approx N_t N_{Rx} M^{N_t}$ | |
| SD | Almost optimal (variable) | $\approx N_t^3 + N_t^2 + M(N_t^2 + N_t) + 2N_t$ | Optimistic lower bound, only available for $N_t = N_{Rx}$ |
| MMSE-SIC | Very High | $\approx N_t N_{Rx} + N_{Rx} + \frac{3}{2}(N_{Rx}^2 + N_{Rx})$ | |
| MMSE-Linear | Low at high SNR | $\approx N_t N_{Rx} + N_{Rx}$ | |

Therefore, always a trade-off between complexity and accuracy of the different decoding approaches has to be taken into account. At present there exists no decoding approach, which can adaptively handle different situations at optimal complexity and accuracy.

SUMMARY

Accordingly, an object of the present application is to provide an apparatus and method, which allow for an efficient and accurate decoding independent of channel conditions and channel state knowledge.

The object is solved by the features of claim 1 for the apparatus and claim 14 for the method. Further it is solved by the features of claim 15 for the associated computer program. The dependent claims contain further developments.

According to a first aspect of the application, a communication device adapted for receiving a MIMO signal is provided. The device comprises a first detector adapted to perform a first symbol detection on the MIMO signal using a first detection method, a detection error determination unit adapted to determine a first detection error of the first symbol detection, a detection error judging unit adapted to determine if the first detection error is above or below a detection threshold, and a second detector, adapted to perform a second symbol detection on the MIMO signal using a second detection method, if the detection error judging unit has determined that the first detection error is above the detection threshold. The communication device is adapted to use results of the symbol detection as final symbol detection results, if the detection error judging unit has determined that the first detection error is below the detection threshold. It is therefore possible to have a low-complexity approach, if this leads to sufficient results, but to have accurate results at the expense of a higher complexity, if necessary.

In a first possible implementation form of communication device according to the first aspect, the detection error determination unit is adapted to determine a second detection error of the second symbol detection. The detection error judging unit is then adapted to determine if the second detection error is below or above the detection threshold. The communication device is adapted to use results of the second symbol detection as final symbol detection results, if the detection error judging error has determined that the second detection error is below the detection threshold. It can thereby be assured that sufficiently accurate detection results are used as final detection results.

In a second possible implementation form of the communication device according to the first implementation form of the first aspect, the second symbol detection method is an iterative symbol detection method. The detection error determination unit is adapted to determine the second detection error after each iteration. The detection error judging unit is adapted to determine if the second detection error is below or above the detection threshold after each iteration. The second detector is adapted to perform a further iteration, if the detection error judging unit has determined that the second detection error is above the detection threshold. The communication device is adapted to use results of the second symbol detection as final symbol detection results, as soon as the detection error judging unit has determined that the second detection error is below the detection threshold. An especially accurate detection is thereby possible.

In a third possible implementation form of the communication device according to the first aspect as such or according to one of the preceding implementation forms of the first aspect, the first detection method comprises a lower detection accuracy at a lower computational complexity than the second detection method. It is thereby assured that for optimal channel conditions, only a lower complexity approach is applied, while at bad channel conditions, a high accuracy approach is applied.

In a fourth possible implementation form of the communication device according to the first aspect as such or according to one of the preceding implementation forms of the first aspect, the first detection method is a minimum means square error detection method or a zero forcing method. The second detection method is then a successive interference cancellation method or a sphere decoder method or a maximum likelihood method. An especially efficient and accurate detection is thereby possible.

In a fifth possible implementation form of the communication device according to the first implementation form of the first aspect, the communication device comprises a third detector adapted to perform a third symbol detection on the MIMO signal using a third detection method, if the detection error judging unit has determined that the second detection error is above the detection threshold. A communication device is then adapted to use results of the third symbol detection independent of a third detection error of the third symbol detection. A further increase in efficiency and accuracy can thereby be achieved.

In a sixth possible implementation form of the communication device according to the fifth implementation form of the first aspect, the first detection method comprises a lower detection accuracy and a lower computational complexity than the second detection method and the second detection method comprises a lower detection accuracy and a lower computational complexity than the third detection method. An especially efficient and accurate detection can thereby be achieved.

In a seventh possible implementation form of the communication device according to the sixth implementation form of the first aspect, the first detection method is a minimum means square error detection method or a zero forcing method. The second detection method is a successive interference cancellation method or a sphere detector method, and the third detection method is a maximum likelihood method. A further increase in efficiency and accuracy can thereby be achieved.

In an eighth possible implementation form of the communication device according to the first aspect as such or according to one of the preceding implementation forms of the first aspect, the communication device comprises a detection threshold determining unit adapted to determine the detection threshold adaptively. An especially flexible approach is thereby possible.

In a ninth possible implementation form of the communication device according to the first aspect as such or according to any of the preceding implementation forms of the first aspect, the detection threshold determining unit is adapted to determine the detection threshold adaptively dependent upon a signal-to-noise-ratio of the MIMO signal, and/or a battery level of a battery of the communication device and/or a temperature of the communication device and/or an availability of computational resources and/or an accuracy of available channel state information of the MIMO signal. It is thereby assured that for different circumstances an optimal detection is achieved.

In a tenth possible implementation form of the communication device according to the first aspect as such or according to any of the preceding implementation forms of the first aspect, the detection threshold determining unit is adapted to determine the detection threshold as a higher value for a lower signal to noise ratio, a lower battery level of the battery of the communication device, a higher temperature of the communication device, a lower availability of computational resources, and a lower accuracy of the available channel state information of the MIMO signal. The detection threshold determining unit is adapted to determine the detection threshold as a lower value for a higher signal-to-noise-ratio, a higher battery level of the battery of the communication device, a lower temperature of the communication device, a higher availability of computational resources, and a higher accuracy of the available channel state information of the MIMO signal. An especially efficient and accurate detection dependent upon circumstances is thereby possible.

In an eleventh possible implementation form of the communication device according to one of the eighth to tenth implementation forms of the first aspect, the detection threshold determining unit is adapted to determine the detection threshold using the formula $$t = N_{Rx} * \sigma^2 + \varepsilon$$

wherein t is the detection threshold, wherein $N_{Rx}$ is a number of receiver antennas receiving the MIMO signal, $\sigma^2$ is the variance of the noise of the transmission channel of the MIMO signal, and c is a detection tolerance parameter adjusting the detection threshold. An especially accurate determining of the detection threshold can thereby be achieved.

In a twelfth possible implementation form of the communication device according to the first aspect as such or according to any of the preceding implementation forms of the first aspect, the detection error determination unit is adapted to determine the detection error using the following formula $$d = \|H^* \bar{x} - y\|_2^2$$

wherein d is a scalar representing a sufficient statistic for the received vector y, H is an effective channel matrix of a transmission channel of the MIMO signal, and $\bar{x}$ is a vector of the detection results. An especially accurate determination of the detection error is thereby possible.

According to a second aspect of the application, a reception method for receiving a MIMO signal is provided. The method comprises performing a first symbol detection on the MIMO signal using a first detection method, determining a first detection error of the first symbol detection, determining if the first detection error is below or above a detection threshold, performing a second symbol detection on the MIMO signal using a second detection method, if it has been determined that the first detection error is above the detection threshold, using results of the first symbol detection as final symbol detection results, if it has been determined that the first detection error is below the detection threshold. It is therefore possible to have a low-complexity approach, if this leads to sufficient results, but to have accurate results at the expense of a higher complexity, if necessary.

In a first possible implementation form of the reception method according to the second aspect, the method comprises determining a second detection error of the second symbol detection, determining if the second detection error is below or above the detection threshold and using results of the second symbol detection as final symbol detection result if the second detection error is below the detection threshold. It can thereby be assured that sufficiently accurate detection results are used as final detection results.

In a second possible implementation form of the reception method according to the first implementation form of the second aspect, the second symbol detection method is an iterative symbol detection method. The method comprises determining the second detection error after each iteration and determining after each iteration if the second detection error is below or above the detection threshold. Moreover, the method then comprises performing a further iteration if the second detection error is above the detection threshold and using results of the second symbol detection as final symbol detection results, as soon as the second detection error is below the detection threshold. An especially accurate detection is thereby possible.

In a third possible implementation form of the reception method according to the second aspect as such or according to one of the preceding implementation forms of the second aspect, the first detection method comprises a lower detection accuracy and a lower computational complexity and a second detection method. It is thereby assured that for optimal channel conditions, only a lower complexity approach is applied, while at bad channel conditions, a high accuracy approach is applied.

In a fourth possible implementation form of the reception method according to the second aspect as such or according to one of the preceding implementation forms of the second aspect, the first detection method is a minimum means square error detection method or a zero forcing method. The second detection method is then a successive interference cancellation method or a sphere detector or a maximum likelihood method. An especially efficient and accurate detection is thereby possible.

In a fifth possible implementation form of the reception method according to the second aspect as such or according to one of the preceding implementation forms of the second aspect, the method comprises performing a third symbol detection on the MIMO signal using a third detection method, if the second detection error is above the detection threshold, and using results of the third symbol detection independent of a third detection error of the third symbol detection. A further increase in efficiency and accuracy can thereby be achieved.

In a sixth possible implementation form of the reception method according to the preceding implementation form of the second aspect, the first detection method comprises a lower detection accuracy and a lower computational complexity and a second detection method and the second detection method comprises a lower detection accuracy and a lower computational complexity than the third detection method. An especially efficient and accurate detection can thereby be achieved.

In a seventh possible implementation form of the reception method according to the preceding implementation form of the second aspect, the first detection method is a minimum means square error detection method or a zero forcing method, the second detection method is a successive interference cancellation method or a sphere detector method and the third detection method is a maximum likelihood method. A further increase in efficiency and accuracy can thereby be achieved.

In an eighth possible implementation form of the reception method according to the second aspect as such or according to one of the preceding implementation forms of the second aspect, the method comprises determining the detection threshold adaptively. An especially flexible approach is thereby possible.

In a ninth possible implementation form of the reception method according to the preceding implementation form of the second aspect, the detection threshold is determined adaptively dependent upon a signal-to-noise-ration of the MIMO signal, and/or a battery level of a battery of the communication device, and/or a temperature of the communication device, and/or a availability of computational resources, and/or an accuracy of available channel state information of the MIMO signal. It is thereby assured that for different circumstances an optimal detection is achieved.

In a tenth possible implementation form of the reception method according to the preceding implementation form of the second aspect, the detection threshold is determined as a higher value for a lower signal-to-noise-ratio, a lower battery level of the battery of the communication device, a higher temperature of the communication device, a lower availability of computational resources, and a lower accuracy of the available channel state information of the MIMO signal. The detection threshold is determined as a lower value for a higher signal-to-noise-ratio a higher battery level of the battery of the communication device, a lower temperature of the communication device, a higher availability of computational resources, a higher accuracy of the available channel state information of the MIMO signal. An especially efficient and accurate detection dependent upon circumstances is thereby possible.

In an eleventh possible implementation form of the reception method according to the second aspect as such or according to one of the preceding implementation forms of the second aspect, the detection threshold is determined using the following formula $$t = N_{Rx} * \sigma^2 + \varepsilon$$

wherein t is the detection threshold, $N_{Rx}$ is a number of receiver antennas receiving the MIMO signal, $\sigma^2$ is the variance of the noise of the transmission channel of the MIMO signal, and $\varepsilon$ is a detection tolerance parameter adjusting the detection threshold. An especially accurate determining of the detection threshold can thereby be achieved.

In a twelfth possible implementation form of the reception method according to the second aspect as such or according to one of the preceding implementation forms of the second aspect, the detection error is determined using the following formula $$d = * \| H * \bar{x} - y \|_2^2$$

wherein d is a scalar representing a sufficient statistic for the received vector y, H is an effective channel matrix of a transmission channel of the MIMO signal, $\bar{x}$ is a vector of the detection results. An especially accurate determination of the detection error is thereby possible.

According to a third aspect of the application, a computer program with a program code for performing the method according to the second aspect of the application, when the computer program runs on a computer is provided.

Generally, it has to be noted that all arrangements, devices, elements, units and means and so forth described in the present application could be implemented by software or hardware elements or any kind of combination thereof. Furthermore, the devices may be processors or may comprise processors, wherein the functions of the elements, units and means described in the present applications may be implemented in one or more processors. All steps which are performed by the various entities described in the present application as well as the functionality described to be performed by the various entities are intended to mean that the respective entity is adapted to or configured to perform the respective steps and functionalities. Even if in the following description or specific embodiments, a specific functionality or step to be performed by a general entity is not reflected in the description of a specific detailed element of that entity which performs that specific step or functionality, it should be clear for a skilled person that these methods and functionalities can be implemented in respect of software or hardware elements, or any kind of combination thereof.

BRIEF DESCRIPTION OF DRAWINGS

The present application is in the following explained in detail in relation to embodiments of the application in reference to the enclosed drawings, in which:

FIG. 3 shows an embodiment of the proposed approach in pseudo-code;

DESCRIPTION OF EMBODIMENTS

Figure 1:
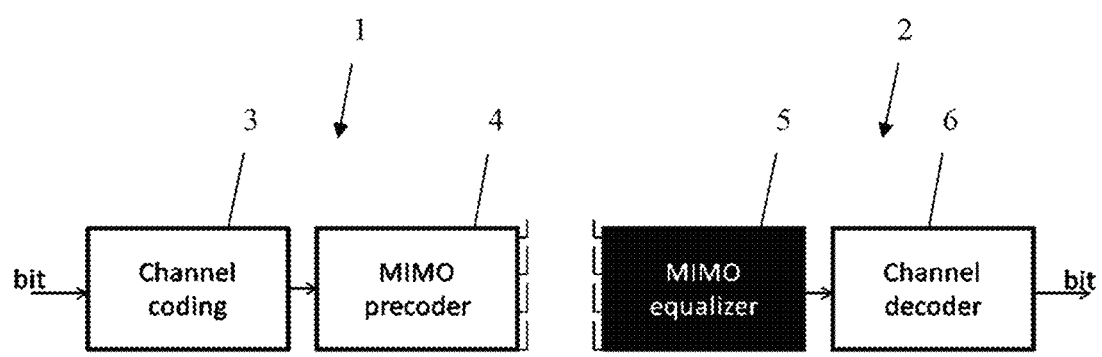
FIG. 1 shows an overview of a MIMO communication system.

The general setup of a MIMO communication system and the underlying problem has been discussed along FIG. 1. With use of FIGS. 2-4, the application is described in a general manner. Along FIG. 5, an embodiment of the first aspect of the application and its function is described in detail. Along FIG. 6, an embodiment of the second aspect of the application and its function is described in detail. Along FIG. 7 and FIG. 8, the benefits of the application are shown. Similar entities and reference numbers in different figures have been partially omitted.

Figure 2:
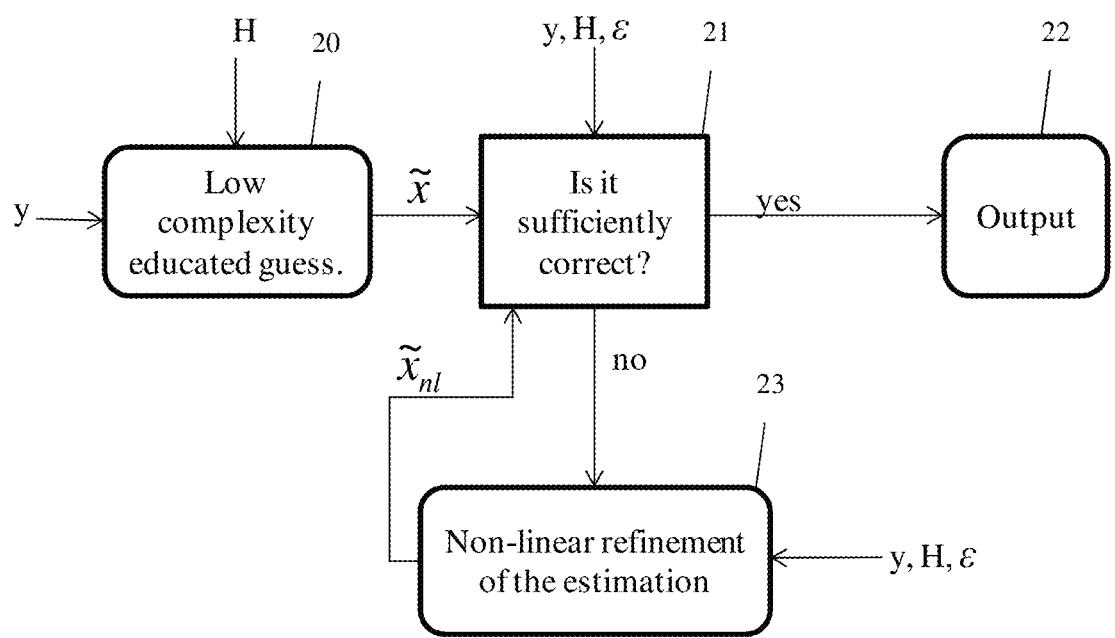
FIG. 2 shows a simplified block diagram of the proposed approach.

The basic idea of the proposed approach is shown in FIG. 2. A low complexity first detection method also referred to as educated guess is employed to a received signal Y in a first step 20. In a second step 21, it is determined if the achieved accuracy is sufficiently good. If so, the first detection result is output in a third step 22. In case it is not sufficiently good, in a fourth step 23, the first result is at least partially refined then tested again. This refinement typically uses a second more complex, but also more accurate detection method.

Here, the value ∈ is a tolerance threshold that tunes between the correctness of the estimation and the complexity, that is, $\epsilon=0$ the best available estimation is performed, while for $\epsilon=\infty$ only the low complexity guess is performed.

Figure 4:
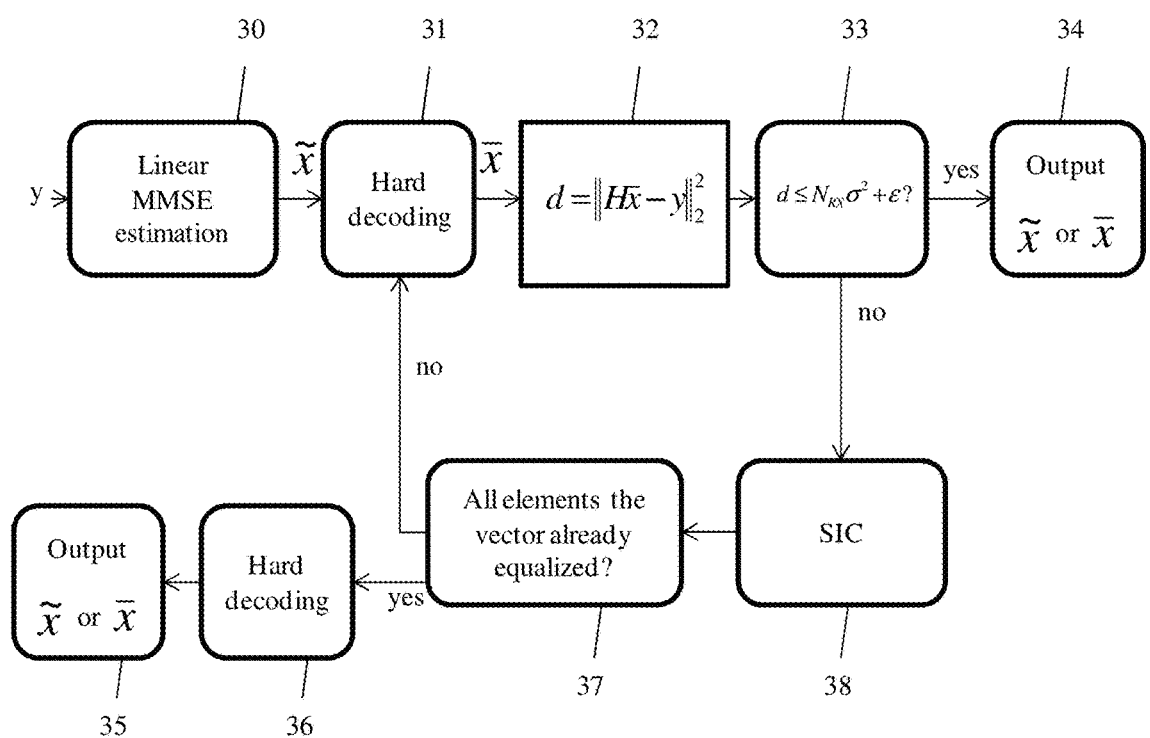
FIG. 4 shows a further block diagram of an embodiment of the proposed approach.

In one embodiment, depicted in FIG. 4, it is proposed to use ordered MMSE-SIC as a non-linear algorithm and MMSE as a low complexity educated guess. Therefore, MMSE is the first detection method, while ordered MMSE-SIC is the second detection method. This choice is motivated by the following reasons:

Linear MMSE is one of the best known linear detection available and its complexity is of the same order of the one of less performing algorithm such a ZF;

Linear MMSE is a step of MMSE-SIC, hence the low complexity guess comes for free in computational terms;

SIC takes care of high Eb/N0 terms first, and linear MMSE is optimal at low Eb/N0, thus there is a reasonable hope that many useless operation will be avoided;

SIC complexity does not depend on the constellation size.

In FIG. 3, a pseudo-code implementing this embodiment is shown.

In a first step 30, a linear MMSE equalized version of the transmit vector ($\tilde{x}$) is computed. Notice that this step is necessary also in standard MMSE-SIC, hence it does not increase the complexity of this algorithm. In a second step 31, this vector is passed through a step function (hard decoding) to obtain an educated guess $\overline{X}$. The educated guess transmission is "simulated" ($H\overline{x}$) and the distance between this vector and the actually received vector is determined $d=\|H\overline{x}-y\|_2^2$ in a third step 32.

This distance d is compared to a detection threshold $d \leq N_{Rx}\sigma^2+\epsilon$ to decide if the guess is sufficiently accurate or not. This test takes the name of "likelihood test". Notice that, if the likelihood test is performed with $\epsilon=0$ then it theoretically guarantees that the educated guess is the best possible guess (i.e., if $d \leq N_{Rx}\sigma^2$ then the educated guess corresponds to the ML equalization). Henceforth, values of $\epsilon>0$ will decrease the performance in terms of BER, but they will decrease the amount of complexity of the algorithm.

If the test is negative, it means that, in the alphabet, there exists one element that has a higher probability of being the better one than the educated guess. In this case, we proceed with one step of SIC in a further step 38. This means that among the non-decoded element of the vector $\overline{x}$ the one with the highest SINR is selected. The interference created by the already decoded element is now subtracted and a new element is therefore decoded. Henceforth, this newly obtained vector is treated as the new educated guess. In a further step 37, it is determined, if all elements of the vector have already been decoded. If this is the case, in a step 36, a hard decoding is performed and the result is output in a step 35.

Since SIC decodes the elements with the highest SINR first there exists a non-negligible probability that the likelihood test $d \leq (N_{Rx}\sigma^2+\epsilon)$ is passed after a few rounds of SIC. This means that the same performance of SIC can be obtained with much less complexity.

A simple SIC is just one possible embodiment. A multi-branch SIC would further increase the performance, at the cost, however, of complexity.

Figure 5:
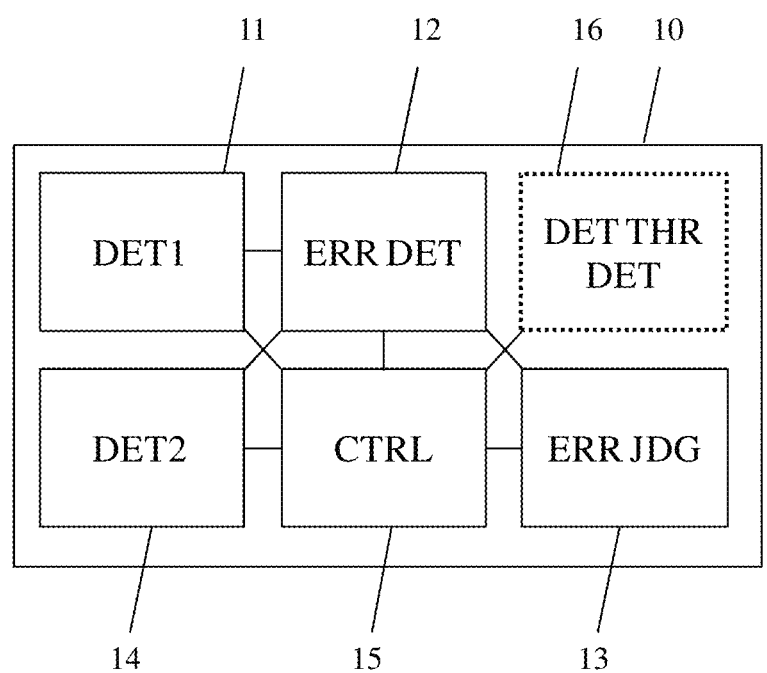
FIG. 5 shows an embodiment of the first aspect of the application in a block diagram.

In FIG. 5, an embodiment of the inventive communication device 10 is shown. Here, only the components relevant for the application, especially all aspects of the symbol detection, which correspond to the MIMO equalizer 5 of FIG. 1, are shown. For reasons of conciseness, other components of the communication device 10 are omitted here.

The communication device 10 comprises a first detector 11, and error determining unit 12, an error judging unit 13, a second detector 14, a control unit 15 and a detection threshold determining unit 16. All units 11, 12, 13, 14 and 16 are connected to the control unit 15. Moreover, the first detector 11 and the second detector 14 are connected to the error determining unit 12. The error determining unit 12 is furthermore connected to the error judging unit 13.

After receiving a MIMO signal, the first detector 11 performs a first symbol detection on the MIMO signal using a first detection method. The detection error determining unit 12 determines a first detection error of the first symbol detection, as shown above. The error judging unit then determines if the first detection error is below or above a detection threshold, as also explained above. If the first detection error is below the detection threshold, the results of the first detector 11 are used as final detection results. In case the first detection error is above the detection threshold, the second detector 14 performs a second symbol detection on the MIMO signal using a second detection method. The results of this second detection can be directly used as the output symbols.

Alternatively, the second symbol detection method can be an iterative method, as shown above. In this case, the iterative method is performed until the error judging unit 13 determines that the second detection error is below the detection threshold. In this case, after each iteration, the error determining unit 12 and the error judging unit 13 perform their functions.

Moreover, in an alternative embodiment, a third detector can be present. The third detector then is connected to the error determining unit 12 and to the control unit 15. The third detector is then configured to perform a third symbol detection, if the second detection error is above the detection threshold.

The first detection method used by the first detector 11 has a lower computational complexity and accuracy than the second detection method employed by the second detector 14. In case of a third detector been present, the computational complexity and accuracy of the third detection method employed by the third detector is higher than the accuracy and computational complexity of the first and second detection methods used by the first and second detectors 11, 14.

In case of using a first and second detector 11, 14 as shown in FIG. 5, the first detection method is a minimum means square error detection method or a zero forcing method. The second detection method is a successive interference cancellation method or a sphere decoder or a maximum likelihood method. In case of using additionally a third detector, the second detection method is a successive interference cancellation method or a sphere decoder method and the third detection method is a maximum likelihood method.

Advantageously, the detection threshold is determined adaptively by the detection threshold determining unit 16. The detection threshold determination unit 16 though is an optional component. The detection threshold determining unit 16 determines the detection threshold adaptively dependent upon a signal-to-noise-ratio of the MIMO signal, and/or a battery level of a battery of the communication device and/or a temperature of the communication device, and/or an availability of computational resources, and/or an accuracy of available channel state information of the MIMO signal.

Especially, the detection threshold is determined as a higher value for a lower signal-to-noise-ratio, a lower battery level of the battery of the communication device, a higher temperature of the communication device, a lower availability of the computational resources, and a lower accuracy of the available channel state information of the MIMO signal. The detection threshold determining unit 16 determines the detection threshold as a lower value for a higher signal-to-noise-ratio, a higher battery level of the battery of the communication device, a lower temperature of the communication device, a higher availability of computational resources and a higher accuracy of the available channel state information of the MIMO signal.

Figure 6:
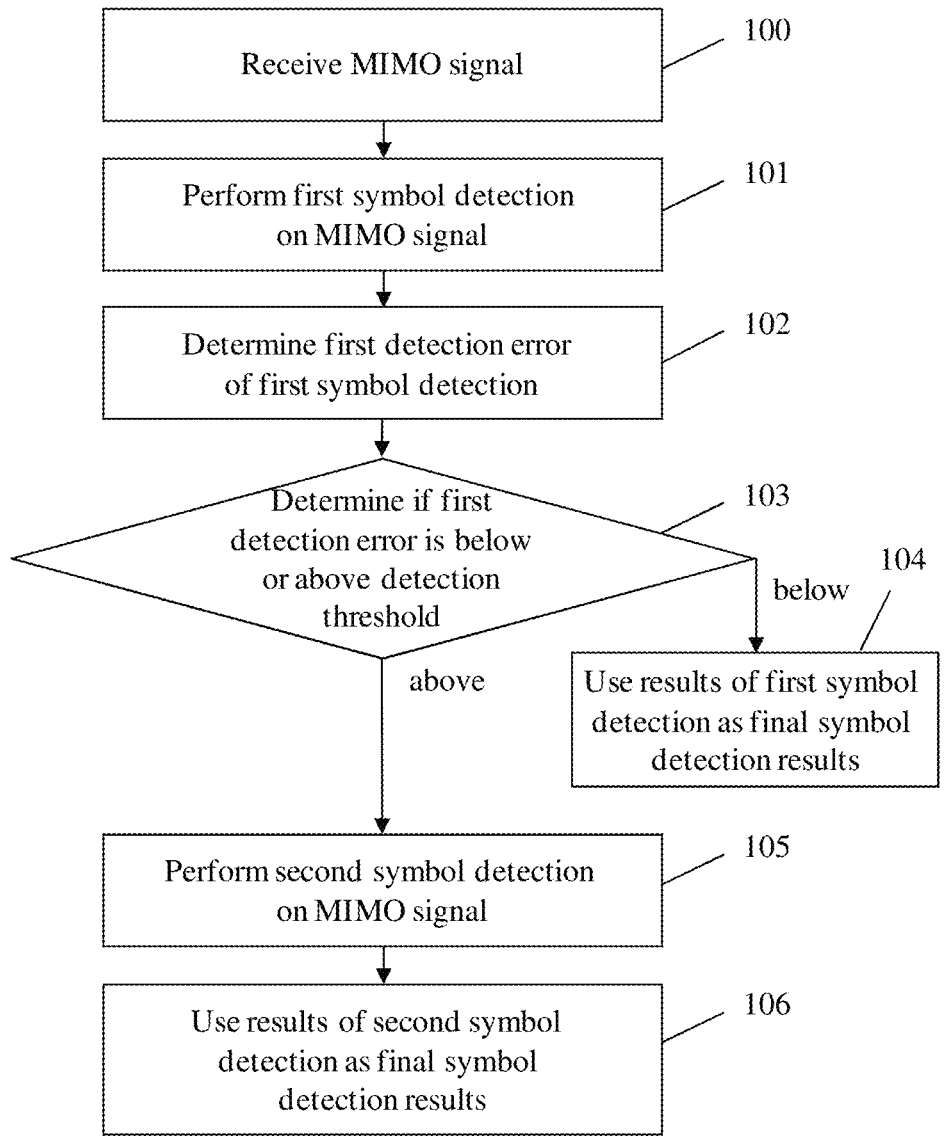
FIG. 6 shows an embodiment of the second aspect of the application in a flow diagram.

In FIG. 6, a flow diagram of an embodiment of the second aspect of the application is shown. In a first step 100, a MIMO signal is received. In a second step 101 a first symbol detection is performed on the MIMO signal. In a third step 102, a first detection error of the first symbol detection is determined. In a fourth step 103, it is determined if the first detection error is below or above the detection threshold. In case it is below, in a fifth step 104 the results of the first symbol detection are used as final symbol detection results. In case the detection error is above the detection threshold, in a sixth step 105, a second symbol detection is performed on the MIMO signal. In a seventh step 106, the results of the symbol detection are then used as final symbol detection results.

Alternatively, the second symbol detection can be performed as an iterative method. In this case, after each step of the iterative method, again the detection error is determined and compared to the detection threshold. In case the detection error is below the threshold, the results are output as final detection results. In case they are above the threshold, a further iteration is performed.

Alternatively, a third symbol detection can be performed after the second symbol detection, and after it has been determined that the second detection error is above the detection threshold. The results of the third symbol detection are then used as final detection results no matter of the achieved detection error.

In the following, some advantages of the application are described.

If $\epsilon=0$, then the proposed approach has an equalization capability non-inferior to the one of MMSE-SIC. Its complexity is also strictly inferior to the one of MMSE-SIC and it is independent from the constellation size.

Figure 7:
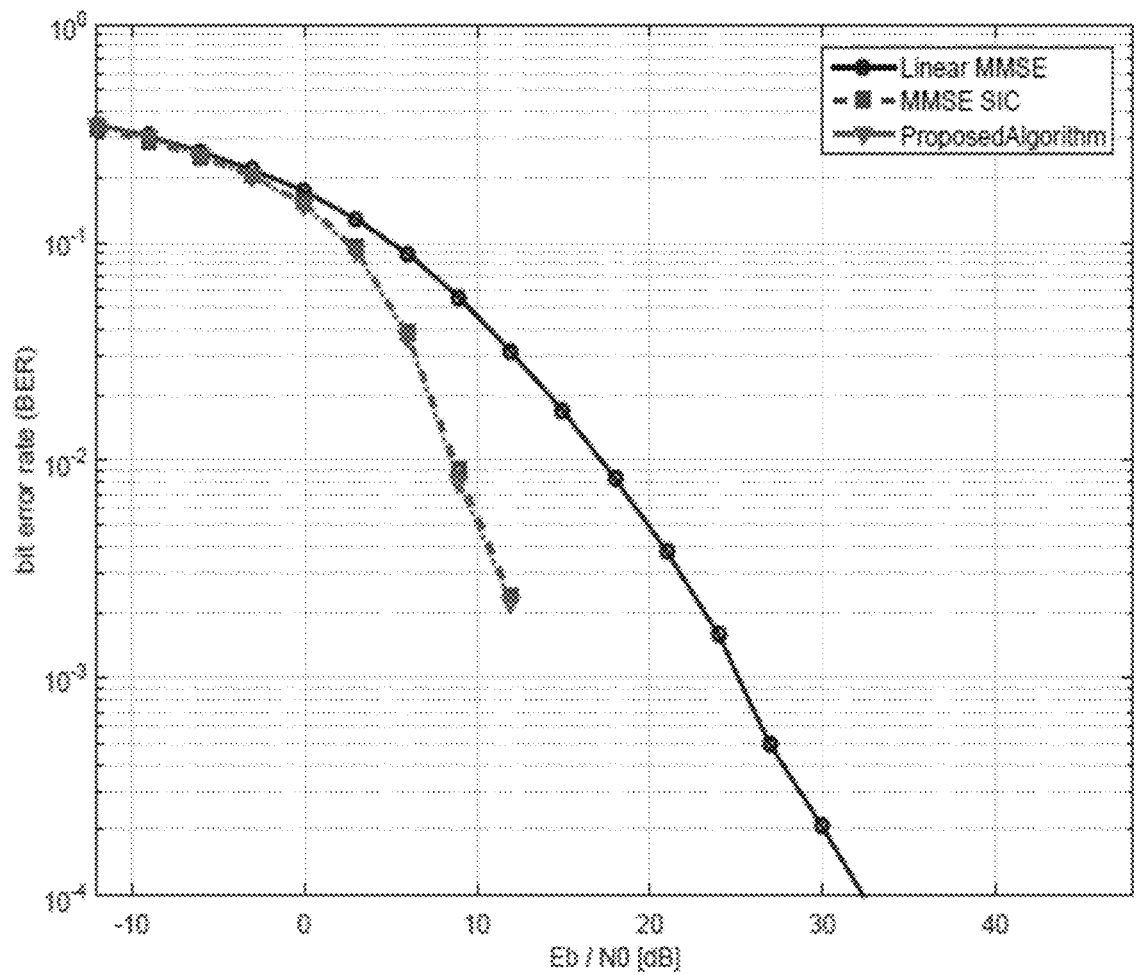
FIG. 7 shows achievable results by use of the application.

In order to showcase the performance of the algorithm, a first simulation assessing the equalization ability is performed against MMSE-SIC. The results of this simulation are depicted in FIG. 7. In accordance with the theory, the performance of the proposed algorithm is not inferior to the one of MMSE-SIC, and is sensibly better than the one of linear MMSE.

Figure 8:
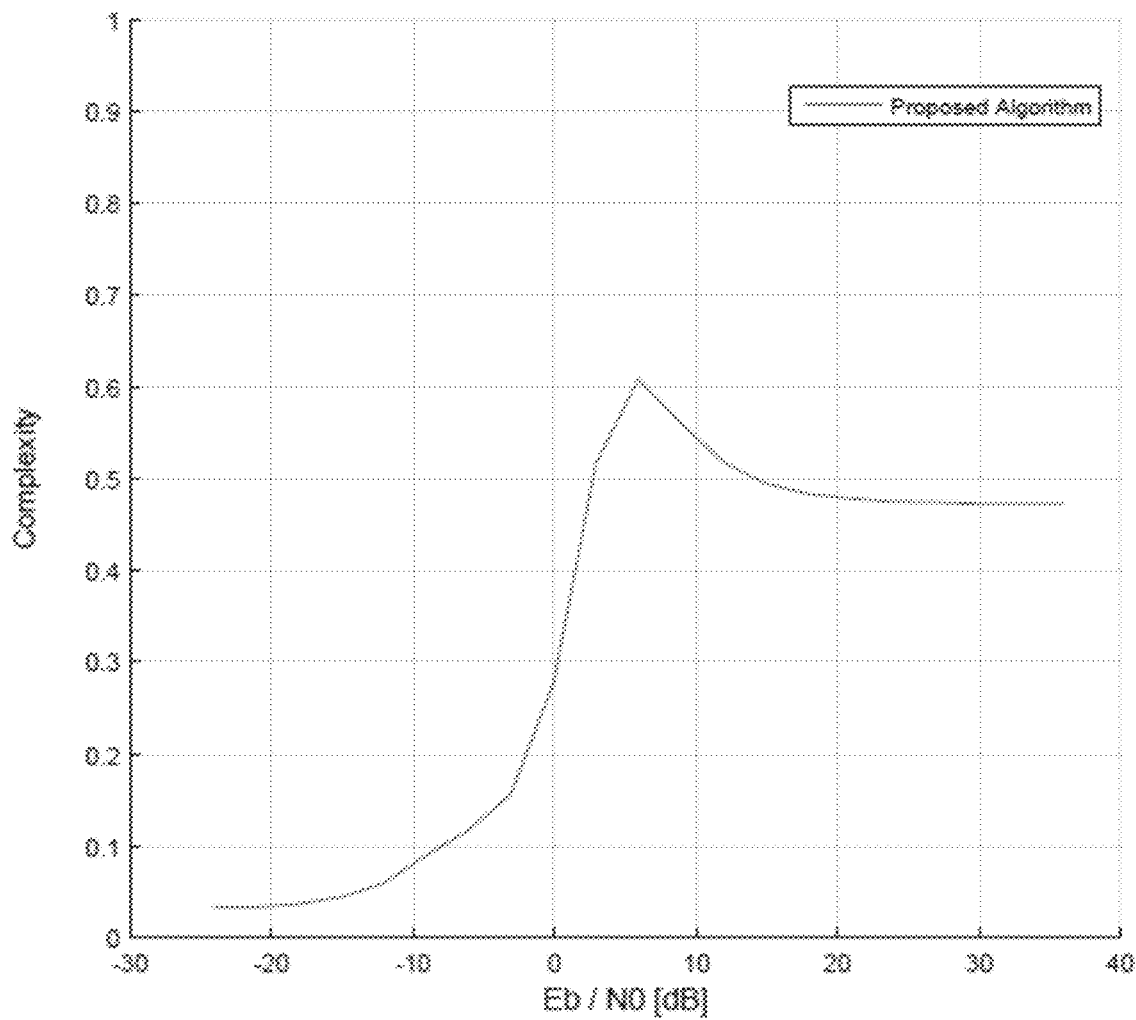
FIG. 8 shows achievable results by use of the application.

In order to assess the complexity gain, a simulation with $M=16$ and $N_t=N_{Rx}=4$ is performed. The complexity is evaluated in terms of percentage of MMSE-SIC operation, in other words, the complexity of MMSE-SIC is equal to 1. It can be noticed how in at low Eb/N0 the educated guess is almost always ML, and thus no more SIC operation are needed. When the Eb/N0 increases, more SIC operations are needed to improve the quality of the educated guess, until a certain regime is reached. This proves that the proposed algorithm can yield a gain in complexity that is of around the 90% at low Eb/N0 and of the 60% at high Eb/N0. This is depicted in FIG. 8.

The application is not limited to the examples and especially not to a specific number of antennas or detection methods. The application discussed above can also be applied to many MIMO communication schemes. The characteristics of the exemplary embodiments can be used in any combination.

The application has been described in conjunction with various embodiments herein. However, other variations to the disclosed embodiments can be understood and effected by those skilled in the art in practicing the claimed application, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

What is claimed is:

1. A communication device adapted for receiving a multiple-input and multiple-output (MIMO) signal, the device comprising:
    a first detector adapted to perform a first symbol detection on the MIMO signal using a first detection method,
    one or more processors adapted to determine if a first detection error of the first symbol detection is below or above a detection threshold,
    a second detector adapted to perform a second symbol detection on the MIMO signal using a second detection method, when the first detection error is determined to be above the detection threshold,
    the one or more processors is further adapted to determine if a second detection error of the second symbol detection is below or above the detection threshold, and
        wherein the communication device is adapted to use results of the first symbol detection as final symbol detection results when the first detection error is determined to be below the detection threshold and the communication device is adapted to use results of the second symbol detection as the final symbol detection results when the second detection error is determined to be below the detection threshold.

2. The communication device according to claim 1, wherein the second symbol detection is an iterative symbol detection method,
    wherein the one or more processors is further adapted to determine the second detection error after each iteration, and determine if the second detection error is below or above the detection threshold after each iteration,
    wherein the second detector is adapted to perform a further iteration, when the second detection error is determined to be above the detection threshold, and
    wherein the communication device is adapted to use results of the second symbol detection as final symbol detection results, when the second detection error is determined to be below the detection threshold.

3. The communication device according to claim 1, wherein the first detection method comprises a lower detection accuracy and a lower computational complexity than the second detection method.

4. The communication device according to claim 1,
wherein the first detection method is a minimum mean square error (MMSE) detection method or a zero-forcing (ZF) method, and
wherein the second detection method is a successive interference cancellation (SIC) method or a sphere decoder (SD) method or a maximum likelihood (ML) method.

5. The communication device according to claim 1, comprising a third detector adapted to perform a third symbol detection on the MIMO signal using a third detection method, when the second detection error is determined to be above the detection threshold, and
wherein the communication device is adapted to use results of the third symbol detection independent of a third detection error of the third symbol detection.

6. The communication device according to claim 5,
wherein the first detection method comprises a lower detection accuracy and a lower computational complexity than the second detection method, and
wherein the second detection method comprises a lower detection accuracy and a lower computational complexity than the third detection method.

7. The communication device according to claim 6,
wherein the first detection method is a minimum mean square error (MMSE) detection method or a zero-forcing (ZF) method,
wherein the second detection method is a successive interference cancellation (SIC) method or a sphere decoder (SD) method, and
wherein the third detection method is a maximum likelihood (ML) method.

8. The communication device according to claim 1, wherein the one or more processors is further adapted to determine the detection threshold adaptively.

9. The communication device according to claim 1,
wherein the one or more processors is further adapted to determine one or more of the following:
a) the detection threshold adaptively dependent upon a signal-to-noise-ratio of the MIMO signal,
b) a battery level of a battery of the communication device,
c) a temperature of the communication device, and/or an availability of computational resources, and/or an accuracy of available channel state information of the MIMO signal.

10. The communication device according to claim 1,
wherein the one or more processors is further adapted to determine the detection threshold as a higher value for a lower signal-to-noise-ratio, a lower battery level of the battery of the communication device, a higher temperature of the communication device, a lower availability of computational resources, and a lower accuracy of available channel state information of the MIMO signal, and
wherein the one or more processors is still further adapted to determine the detection threshold as a lower value for a higher signal-to-noise-ratio, a higher battery level of the battery of the communication device, a lower temperature of the communication device, a higher availability of computational resources, and a higher accuracy of the available channel state information of the MIMO signal.

11. The communication device according to claim 8, wherein the one or more processors is further adapted to determine the detection threshold through the following:

$$t = NRx * \sigma^2 + \varepsilon$$

wherein t is the detection threshold,
wherein NRx is a number of receiver antennas receiving the MIMO signal,
wherein $\sigma^2$ is the variance of the noise of the transmission channel of the MIMO signal,
wherein $\varepsilon$ is a detection tolerance parameter adjusting the detection threshold.

12. The communication device according to claim 1,
wherein the one or more processors is further adapted to determine the detection errors through the following:

$$d = \|H^* \bar{x} - y\|_2^2$$

wherein d is a scalar representing a sufficient statistic for the received vector y,
wherein H is an effective channel matrix of a transmission channel of the MIMO signal,
where $\bar{x}$ is a vector of the detection results.

13. A reception method for receiving a multiple-input and multiple-output (MIMO) signal, the method comprising:
performing a first symbol detection on the MIMO signal using a first detection method,
determining if a first detection error of the first symbol detection is below or above a detection threshold,
performing a second symbol detection on the MIMO signal using a second detection method, when it has been determined that the first detection error is above the detection threshold,
determining if a second detection error of the second symbol detection is below or above the detection threshold,
using results of the first symbol detection as final symbol detection results when the first detection error is below the detection threshold; and
using results of the second symbol detection as the final symbol detection results when the second detection error is below the detection threshold.

14. The method according to claim 13, wherein the second symbol detection is an iterative symbol detection method, and the method further comprises:
determining the second detection error after each iteration,
determining if the second detection error is below or above the detection threshold after each iteration,
performing a further iteration, when it has determined that the second detection error is above the detection threshold, and
using results of the second symbol detection as final symbol detection results, when it has determined that the second detection error is below the detection threshold.

15. The method according to claim 13, wherein the first detection method comprises a lower detection accuracy and a lower computational complexity than the second detection method.

16. The method according to claim 13, wherein the first detection method is a minimum mean square error (MMSE) detection method or a zero-forcing (ZF) method, and
wherein the second detection method is a successive interference cancellation (SIC) method or a sphere decoder (SD) method or a maximum likelihood (ML) method.

17. A non-transitory computer readable medium, comprising processor-executable instructions stored thereon, which when executed by a hardware processor cause the processor to implement operations including:

performing a first symbol detection on the MIMO signal using a first detection method, determining if a first detection error of the first symbol detection is below or above a detection threshold, performing a second symbol detection on the MIMO signal using a second detection method, when it has been determined that the first detection error is above the detection threshold, determining if a second detection error of the second symbol detection is below or above the detection threshold, using results of the first symbol detection as final symbol detection results when the first detection error is below the detection threshold; and using results of the second symbol detection as final symbol detection results when the second detection error is below the detection threshold.

18. The computer readable medium according to claim 17, wherein the operations further include:

determining a second detection error of the second symbol detection, determining if the second detection error is below or above the detection threshold, and using results of the second symbol detection as final symbol detection results, when it has determined that the second detection error is below the detection threshold.

\* \* \* \* \*